United States Patent [19]
Horl et al.

[11] 3,790,781
[45] Feb. 5, 1974

[54] CATHODOLUMINESCENCE DEVICE FOR SCANNING ELECTRON MICROSCOPES

[75] Inventors: Erwin Horl; Peter Scholze; Eduard Mugschl, all of Vienna, Austria

[73] Assignee: Oesterreichische Studiengesellschaft fur Atomenergie Gesellschaft m.b.H., Vienna, Austria

[22] Filed: Sept. 28, 1972

[21] Appl. No.: 292,954

[30] Foreign Application Priority Data
Oct. 5, 1971  Austria ................................ 8603/71

[52] U.S. Cl. .................................. 250/310, 250/491
[51] Int. Cl. ............................................. H01j 37/26
[58] Field of Search ................. 250/49.5 B, 49.5 PE

[56] References Cited
UNITED STATES PATENTS
3,319,071    5/1967    Werth ............................ 250/43.5 R Primary Examiner—James W. Lawrence
Assistant Examiner—C. E. Church
Attorney, Agent, or Firm—Ernest G. Montague

[57] ABSTRACT

A cathodoluminescence device for scanning electron microscopes which comprises a hollow space for arranging a specimen therein, and said hollow space having at least one focus and provided with a reflecting cover.

6 Claims, 1 Drawing Figure

PATENTED FEB 5 1974
3,790,781
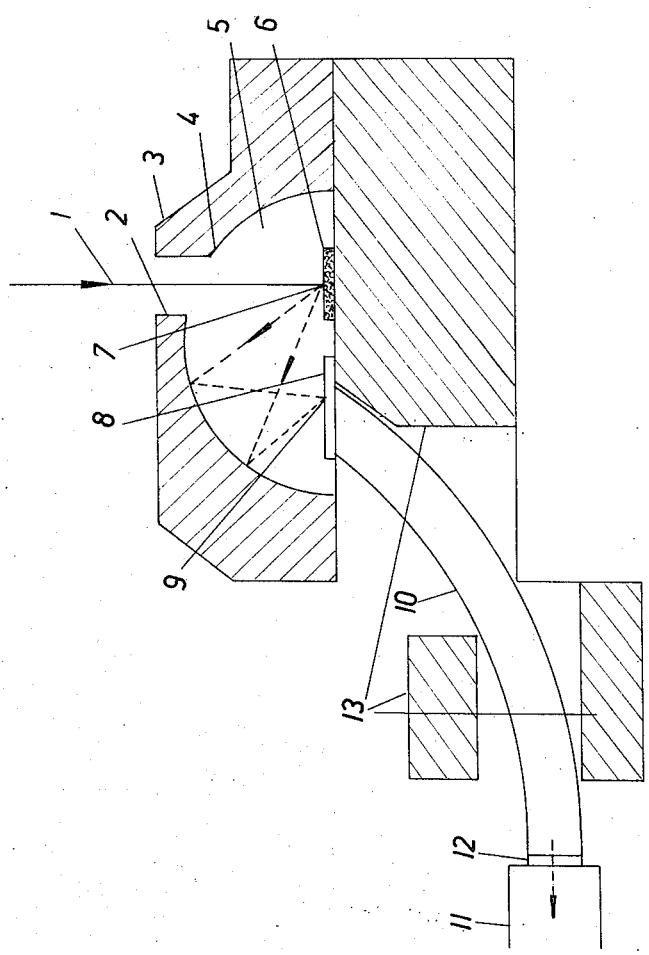

CATHODOLUMINESCENCE DEVICE FOR SCANNING ELECTRON MICROSCOPES

The invention refers to a cathodoluminescence device for scanning electron microscopes.

Using the known cathodoluminescence devices for scanning electron microscopes either light conductors the front faces of which survey just very small solid angles are brought near to the specimen or the light produced at the specimen is focussed by an optical lens onto the front face of a light conductor or directly onto a detector. Even in the second case the solid angle surveyed is small compared to the solid angle of the apparatus described below, and thus the sensibility gained by such devices is low. Further it is not possible with the devices known at present, to prevent energised electrons back-scattered at the specimen from hitting the front face of the light conductor or the lens. By this hitting scintillations are produced which give rise to a noise or interfering signal. In case that the specimen just shows a very low cathodoluminescence it is often not possible anymore on account of this noise signal to use the cathodoluminescence for the representation of the specimen by the scanning electron microscope.

In accordance with the invention it is proposed now that the specimen is placed into a hollow space coated with a reflecting layer and having at least one focus. By this provision the disadvantages mentioned above are avoided.

The invention will now be described further by way of the drawings.

The inventive device comprises a block 3 having a bore 2. Within the block 3 there is a hollow space 5. The most advantageous geometrical configuration for this hollow space 5 has been proved to be the semi-ellipsoid of revolution. However, the hollow space might also be a hemisphere. The curved face of the hollow space is provided as a mirror 4. Into this hollow space 5 the specimen 6 is placed at the one focus 7 of the ellipsoid and is arranged below the bore 2 through which the electron ray 1 passes. The light produced at the surface of the specimen is focussed by the mirror 4 at the other focus 9. At this focus a shutter 8 is provided the centre of aperture of which coincides with the focus 9. By means of the light conductor 10 being made preferably from quartz, the light passing the shutter aperture is guided to a detector 11. In front of this detector an optical filter 12 is arranged which preferably prevents the passage of this spectral range comprising the wave lengths of the light quanta being released by the fast electrons at the entrance face of the light conductor 10; thereby a decrease of the noise signal in the detector 11 is achieved. In the radiation path of the primary electron ray 1 a thin aluminium foil is arranged to cut out the incandescent light of the electron gun.

The block 3, the specimen 6 and the light conductor 10 together with the shutter 8 are arranged on a support 13 being attached to the specimen motion tongue, not shown, of the scanning electron microscope. By the fact that the shutter 8 is arranged in front of the light conductor 10 the number of the highly energized electrons hitting the light conductor is strongly reduced. However the light quanta focussed in the focus 9 are not affected. The block 3 and the mirror 4 consist of a material having a low atomic number thus a further back-scattering of the highly energized electrons being already reflected at the specimen is lessened.

The invention is not restricted to the shown examples. The hollow space might also be a hemisphere, then the specimen is arranged eccentrically. Moreover it is not absolutely necessary that the complete inner face of the hollow space is covered with a reflecting layer. In parallel to the bottom of the hollow space a bore might be provided through which the secondary electrons might be drawn off. These secondary electrons can be used for generating a representation.

We claim:

1. An electron-microscope cathodoluminescence device, comprising
   a support having a face,
   a block disposed on said face of said support and forming a hollow space having a semi-ellipsoidal surface of revolution and having two foci on said face,
   means for positioning a specimen at one of said foci,
   a light reflecting layer at least partially coating said semi-ellipsoidal surface,
   said block being formed with a bore,
   electron ray means for passing an electron ray through said bore onto said specimen, and
   a detector means for detecting light emitted by said specimen disposed at the other of said foci.

2. The device, as set forth in claim 1, wherein said detector means comprises,
   a light conductor having an end disposed at said other of said foci, and
   a detector in communication with another end of said light conductor.

3. The device, as set forth in claim 1, further comprising
   a shutter having an aperture, the latter disposed coinciding with said other of said foci.

4. The device, as set forth in claim 1, wherein said reflecting layer and block comprise a material having a low atomic number.

5. The device, as set forth in claim 1, further comprising
   a thin aluminum foil disposed in the radiation path of said electron ray.

6. An electron-microscope cathodoluminescence device, comprising
   a support having a face,
   a block disposed on said face of said support and forming a hollow space having a hemispherical surface and having one focus on said face,
   means for arranging a specimen eccentric to said focus, a light reflecting layer at least partially coating said hemispherical surface,
   said block being formed with a bore,
   electron ray means for passing an electron ray through said bore onto said specimen,
   a detector means for detecting light emitted by said specimen positioned at said focus.

* * * * *